July 27, 1965 T. H. FLOWERS 3,197,571

SIGNALLING CIRCUITS

Filed April 26, 1962

THOMAS H. FLOWERS,
INVENTOR

BY Hall + Houghton

ATTORNEY

United States Patent Office 3,197,571
Patented July 27, 1965

3,197,571
SIGNALLING CIRCUITS

Thomas Harold Flowers, London, England, assignor to Her Majesty's Postmaster General, London, England Filed Apr. 26, 1962, Ser. No. 190,378
Claims priority, application Great Britain, May 11, 1961, 17,269/61, Patent 985,198
8 Claims. (Cl. 179—84)

This invention relates to signalling circuits and more particularly to a signalling circuit in which an electric signal is converted to an audible signal.

One form of such a circuit is commonly known as a tone-sounder and is suitable for use in subscribers' apparatus connected to electronic telephone exchanges.

The low-frequency relatively high-power electric signal which is transmitted from electromechanical exchanges to ring bells, e.g. bells associated with subscribers apparatus, is expensive and difficult to provide from electronic exchanges. In consequence it is advantageous for exchanges of this kind to transmit an audio frequency electrical signal i.e. a tone, at a power equivalent to loud speech, e.g. 4 mw. over the subscribers line and for this electric signal to be converted to an audible signal by a so-called tone-sounder at the subscribers apparatus. The tone-sounder includes an electric-to-acoustic transducer which may take the form of a loud speaker mechanism, or of a telephone receiver, often having resonant cavity to increase the sound output at the tone frequency. Difficulty arises however in producing an audible signal which is sufficiently loud for all the purposes for which a tone-sounder is desired in practice. At high audio frequencies at which electric-to acoustic transducers of small size are efficient the power of an electric A.F. signal which can be sent over the lines from the exchange is limited by cross-talk between subscribers lines and in conjunction with high attenuation results in too little power at the sounder. At low audio frequencies at which a relatively high power electric signal e.g. 10 mw, can be transmitted and at which the line attenuation is low, the transducers have to be inconveniently large to be efficient. If amplification of a low level electric signal is provided in the telephone using current from the exchange battery conducted over the subscribers line as a power source, the cost and complexity of the amplifier are disadvantageous and give rise to further difficulties.

According to the present invention a signalling circuit includes a transistor oscillator comprising a capacitor and an impedance having a low magnitude of D.C. impedance connected in series between the oscillator input terminals, the emitter electrode of the transistor connected by a D.C. path to the junction between the capacitor and the impedance, a transformer tuned to a relatively high audio-frequency, the transformer having a first winding between the collector electrode of the transistor and the end of the capacitor not connected to the impedance, the transformer having also a positive feedback winding connected together with the impedance in the emitter-base circuit of the transistor, and at least one electro-acoustic transducer coupled to the transformer, the arrangement being such that on connection of a D.C. power source together with a relatively low audio-frequency signal source to the input terminals, the transistor oscillator oscillates at the relatively high audio-frequency during alternate half-cycles of the relatively low audio-frequency signal.

A signalling circuit in accordance with the invention may form part of a subscriber's apparatus in a telephone signalling system, the subscribers line being connected to the oscillator input terminals and the D.C. power source and the relatively low frequency audio-frequency signal source connected to the exchange end of the line in order to actuate the oscillator. If a suitable transistor is chosen for the oscillator, the accuracy of line insulation resistance measurements up to or exceeding 2M ohms is not impaired.

Conveniently the impedance having a low D.C. resistance may comprise a resistor or an inductor. Conveniently, the transformer may be tuned by a capacitor connected in parallel with the primary winding of the transformer.

The windings of the tuned transformer may form part of the electric-to-acoustic transducer. Alternatively, the transducer can have a separate winding which may be connected in series or in parallel with the primary winding of the transformer.

By way of example, embodiments of the invention will be described in greater detail with reference to the accompanying drawings in which.

Figures 1, 2, 3, 4:
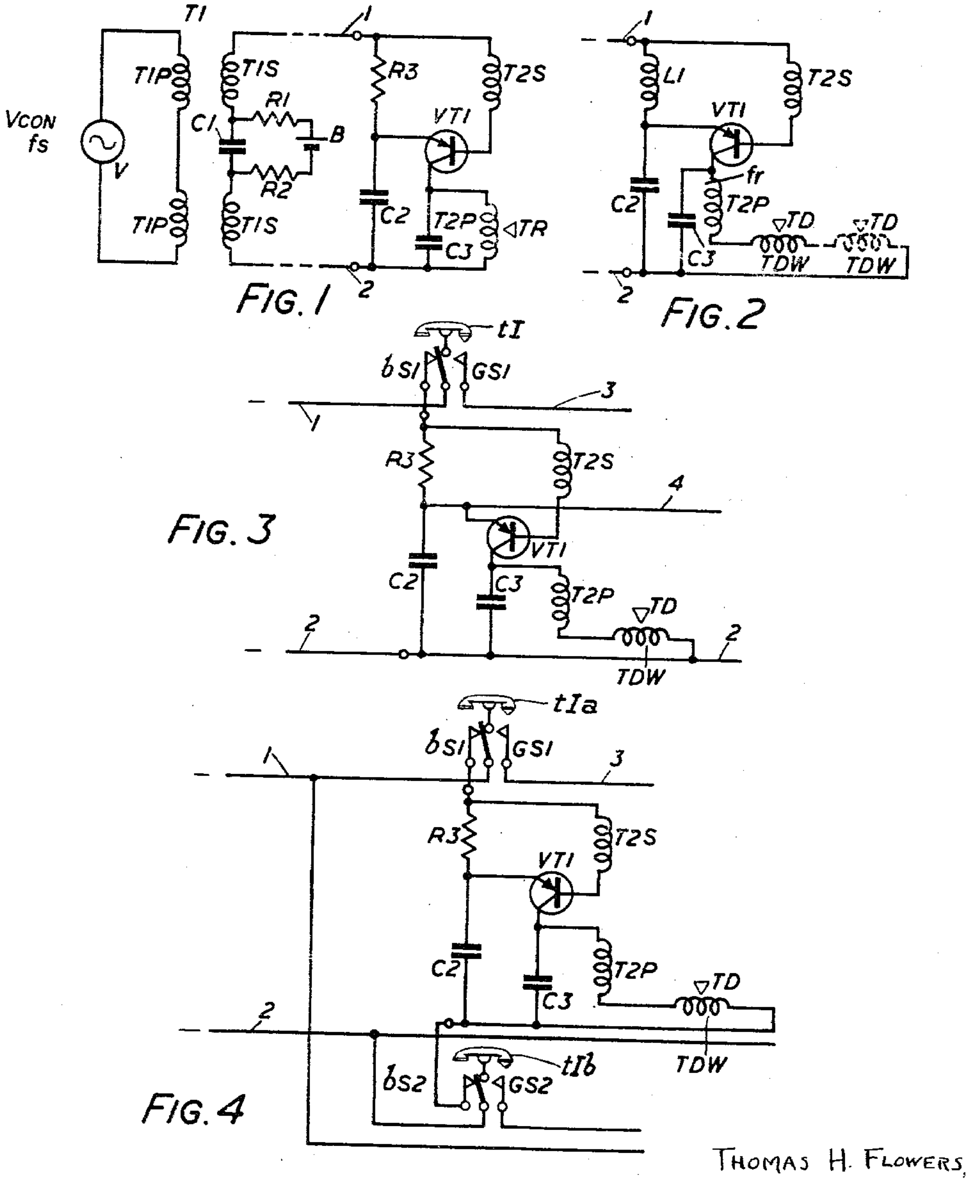
FIGURE 1 shows a simple embodiment.
FIGURE 2 shows a more complicated embodiment.
FIGURE 3 shows the circuit of part of a telephone hand-set embodying the invention.
FIGURE 4 illustrates the use of the invention with two telephone hand-sets connected in parallel on the same exchange line.

FIGURE 1 shows telephone equipment including a tone-sounder embodying the invention and also shows associated equipment which is located in the telephone exchange, or central office, of the system. In this figure, a line transformer T1 in the exchange receives in its exchange winding T1P a tone ringing control signal *Vcon*, at a relatively low audio-frequency *fs*, from an equipment in the exchange. The control signal is transmitted via line windings T1S of transformer T to line conductors 1 and 2. Between the line windings T1S is connected a capacitor C1 across which the exchange battery B is applied via resistors R1 and R2. The exchange battery B is a source of D.C. power for the tone-sounder, the tone ringing control signal *Vcon* being super-imposed on this direct current in order to actuate the tone-sounder.

The tone-sounder includes a capacitor C2 connected in series with a resistor R3 having a low resistance (e.g. 1000 ohms) the combination C2R3 bridging the line conductors 1 and 2. A transistor VT1 has its emitter connected to the junction of the capacitor C2 and resistor R3. A tuned transformer T2 has a primary winding T2P connected between the collector of transistor VT1 and the side of capacitor C2 which is connected to line conductor 2. The transformer T2 is tuned to resonate at a desired relatively high audio-frequency, *fr*, by a capacitor C3 connected in parallel with the primary winding T2P. The transformer T2 has a secondary winding T2S which is connected as a positive feedback winding between the base of transistor VT1 and the end of resistor R3 which is connected to line conductor 1. Transformer T2 is shown in this figure as forming part, e.g., the windings, of an electric-to-acoustic transducer TR which has a resonant frequency *fr* and which is operated by current flow through the windings of the transformer T2.

In use of the circuit shown in FIGURE 1, the capacitor C2 is normally charged to the potential of the battery B; the transistor VT1 has zero base-emitter voltage and passes little more than collector leakage current ($I_{co}$) to the collector circuit which includes the potential across capacitor C2. Under these conditions it is necessary that the impedance between the emitter and collector of transistor VT1 is at least as large as the lowest insulation resistance permitted to the line loop. Silicon transistors are available which have, under the above conditions, emitter-collector impedances greater than 2M ohms, which magnitude of line insulation resistance measurement may be required.

In order to actuate the tone-sounder, the control signal V*con* is applied across the windings T1P of transformer T1 and thereby transmitted over line conductors 1 and 2. During negative half-cycles of this control signal the potential difference between conductors 1 and 2 is reduced and capacitor C2 commences to discharge and causes current to flow in the emitter-collector circuit of the transistor VT1, which for the polarities indicated must be of *pnp* type. When this current reaches a critical magnitude the tone-sounder circuit commences to oscillate at the resonant frequency *fr* of transformer T2 thereby causing the electric-to-acoustic transducer TR to emit an audible signal at a frequency *fr*, and this frequency is independent of the control signal frequency *fs*. During positive half cycles of the control signal V*con*, and when the control signal is switched off, the transistor VT1 is cut off and the tone-sounder circuit does not oscillate. The audible signal produced by the transducer TR thus has a frequency *fr* modulated by the control signal frequency *fs*.

Preferably, the control signal frequency *fs* is made as low as possible, i.e., towards the lower cut-off frequency of transformer T1, so that the power which can be transmitted over line conductors 1 and 2 is high and the attenuation of the line is low. A suitable value of *fs* is 300 c./s.

For the electric-acoustic transducer and tuned transformer TR loud-speaker and telephone receiver types of construction designed to be resonant at a suitable frequency, e.g. 2000 c./s, can be used. It can be difficult and expensive, however, to wind these components with enough turns to make the inductance of the winding T2P high enough to absorb most of the power available in the collector circuit of transistor VT1. Alternatively, the control signal power required from the source V*con* becomes inconveniently large for a telephone exchange and the mean current drawn from the battery B becomes comparable with the line current when the line is looped, making detection of answering a call difficult. For these reasons an arrangement as shown in FIGURE 2 usually is desirable. In Figure 2, the transformer T2 has low losses at the resonant frequency *fr*. The winding T2P does not form part of the electro-acoustic transducer. In FIGURE 2, the transducers TD each have a single winding TDW of low resistance which are connected in series with the primary winding T2P, the series arrangement of windings T2P and TDW being shunted by the capacitor C3 to control the resonant frequency. Alternatively, the windings TDW may be connected in series with the capacitor C3 or the windings TDW may comprise windings of the transformer T2. An advantage of the FIGURE 2 arrangement is that the current flow through the capacitor C3 tends to be constant over a wide range of added load resistance. Hence the audible signal output from the transducers TD tends to be independent of the number of those transducers connected in series with the winding T2P.

In FIGURE 2, the resistor R2 of FIGURE 1 is replaced by an inductor L1. This results in an increased current output from transistor VT1 for a given magnitude of voltage of the control signal V*con* applied to the input of the tone-sounder circuit. Whether a resistor or an inductor is used in any particular locality depends on the level of control signal V*con* which can be produced at the tone-sounder circuit input and the level of audible signal output required at the location.

FIGURE 3 shows part of the circuit of a telephone hand-set embodying the invention. The circuit includes as capacitor C2, a capacitor having a capacitance of 2 $\mu$f. already existing in the hand-set. In this circuit capacitor C2 is connected in series with a resistor R3, as shown in FIGURE 1, and primary winding T2P is connected in series with winding TDW of transducer TD as described with reference to FIGURE 2. Conductors 2, 3 and 4 lead to the remainder of the hand-set in known manner.

When a call is answered the D.C. loop which occurs in the hand-set reduces the voltage between the line conductors 1 and 2, for example from 50 to 10 volts, thus reducing the audible signal output which can be obtained from the tone-sounder. However, in the looped condition speech currents may operate the tone-sounder and produce an annoying level of audible signal from the electric-to-acoustic transducer whilst conversation is in progress. It is desirable, therefore, to disconnect the tone-sounder when a call is answered and a suitable switching arrangement is shown in FIGURE 3. A gravity switch GS1, normally existing in the telephone hand-set has an additional contact *bs*1 which connects the base end of resistor R3 to line conductor 1 when the gravity switch GS1 is pressed down by the weight of the telephone instrument or receiver indicated diagrammatically at *t*I; in this position of the gravity switch the connection between conductors 1 and 3 is broken. The tone-sounder is thus connected between conductors 1 and 2 and is ready to respond to a control signal V*con*. When the telephone instrument is lifted the gravity switch contacts move so that the connection between conductor 1 and contact *bs*1 is broken whilst a connection between conductors 1 and 3 is established. In this latter position of the gravity switch GS the tone-sounder cannot respond to speech currents.

FIGURE 4 shows a tone-sounder used in conjunction with two telephone hand-sets connected in parallel to the same exchange line. The two hand-sets have instruments or receivers *tIa* and *tIb* gravity switches GS1 and GS2 respectively, provided with additional contacts *bs*1 and *bs*2. Contact *bs*1 connects line conductor 1 to the base end of resistor R3 when the gravity switch G*s*1 is depressed, as in FIGURE 3, whilst contact *bs*2 connects the collector end of capacitor G2 to line conductor 2 when gravity switch GS2 is depressed. With both switches GS1 and GS2 depressed the tone-sounder can be actuated by a control signal V*con* whilst lifting of either instrument disconnects the tone-sounder from the exchange line. In this figure capacitor C2 does not form part of either telephone hand-set.

I claim:

1. A signalling circuit including
   (A) an oscillator circuit comprising
      (i) a transistor having base, emitter and collector electrodes,
      (ii) a capacitor,
      (iii) an impedance having a low magnitude of D.C. impedance,
      (iv) a transformer including
         (a) a primary winding and
         (b) a secondary winding,
      (v) a tuned circuit including said primary winding and tuned to a relatively high audio-frequency, and
      (vi) input terminals for the oscillator circuit,
      (vii) said capacitor and impedance being connected in series between the said input terminals,
      (viii) D.C. conduction means connecting said emitter electrode to the junction of said capacitor and impedance,
      (ix) said tuned circuit being connected between said collector electrode and the end of said capacitor not connected to the said impedance, and
      (x) said secondary winding providing positive feedback means and being connected together with the said impedance in the base-emitter circuit of said transistor,
   (B) an electro-acoustical transducer, and means coupling said electro-acoustical transducer to said transformer,
   (C) a D.C. power source continuously connected to said input terminals and continuously applying a D.C. potential across said terminals, (D) an audio-frequency signal source of relatively low frequency as compared to the frequency to which said tuned circuit is tuned, and (E) means for connecting said audio-frequency signal source to said input terminals when it is desired to activate said oscillator circuit;

(F) said audio-frequency signal source when so connected biasing said transistor to a conductive state during alternate half cycles of said relatively low frequency audio-frequency signals, and (G) said D.C. power source supplying input energy to said oscillator circuit when said transistor is so biased.

2. A circuit according to claim 1, in which the impedance is an inductor.

3. A circuit according to claim 1, in which the impedance is a resistor.

4. A circuit according to claim 1 in which the electroacoustical transducer has a coil connected in series with said primary winding.

5. A circuit according to claim 4, in which said tuned circuit comprises a capacitor connected in parallel with said primary winding.

6. A telephone system comprising a signal circuit according to claim 1, and further comprising (H) a central office, (J) a telephone line comprising a pair of wires connected at one end, respectively, to said input terminals and terminating at their other ends in said central office, (K) said D.C. power source being located at said central office and being continuously connected to said input terminals by way of said telephone line, (L) said audio-frequency signal source being located at said central office, (M) said means for connecting said audio-frequency source to said input terminals comprising said telephone line, and (N) a telephone handset connected across said terminals the answering of which establishes a D.C. loop that reduces the voltage between said terminals, thus reducing the audible signal output which can be obtained from said signal circuit.

7. A telephone system according to claim 6, said telephone handset also including a switch actuable by removal of the telephone receiver from its rest to disconnect said signal circuit from said telephone line.

8. A telephone system according to claim 6, in which said transistor has, in its inoperative condition, a collector-emitter impedance greater than the insulation resistance of said telephone line.

References Cited by the Examiner

UNITED STATES PATENTS

| | | | |
|---|---|---|---|
| 2,759,179 | 8/56 | Kircher | 179—84 |
| 2,824,175 | 2/58 | Meacham et al. | 179—84 |
| 3,075,048 | 1/63 | Boeryd | 179—84 |

ROBERT H. ROSE, *Primary Examiner.*

WALTER L. LYNDE, *Examiner.*